(12) United States Patent
Click et al.

(10) Patent No.: US 8,997,522 B2
(45) Date of Patent: Apr. 7, 2015

(54) GLASS CONTAINER HAVING A GRAPHIC DATA CARRIER

(75) Inventors: Carol A. Click, Corning, NY (US); Brian J. Chisholm, Sylvania, OH (US); Edward Ordway, Toledo, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 116 days.

(21) Appl. No.: 13/533,051

(22) Filed: Jun. 26, 2012

(65) Prior Publication Data
US 2013/0341228 A1  Dec. 26, 2013

(51) Int. Cl.
*C03C 23/00*  (2006.01)

(52) U.S. Cl.
CPC ......... *C03C 23/0025* (2013.01); *C03C 23/0035* (2013.01); *C03C 23/003* (2013.01)

(58) Field of Classification Search
CPC  C03C 23/001; C03C 23/0015; C03C 23/002; C03C 23/0025; C03C 23/003; C03C 23/0035; C03C 23/004; C03C 23/0045; C03C 23/005; C03C 23/0055; C03C 23/006; C03C 23/0065; C03C 23/0005; B41M 5/24; B65D 2203/00; B65D 2203/06
USPC .......................................... 206/459.1, 459.5
See application file for complete search history.

(56) References Cited

U.S. PATENT DOCUMENTS

| 3,502,022 | A | * | 3/1970 | Wood ............................ 101/129 |
| 4,769,310 | A | | 9/1988 | Gugger et al. |
| 5,030,551 | A | | 7/1991 | Herren et al. |
| 5,206,496 | A | | 4/1993 | Clement et al. |
| 7,115,209 | B2 | * | 10/2006 | Grimard ........................ 216/31 |
| 2003/0044582 | A1 | * | 3/2003 | Sakoske ........................ 428/195 |
| 2010/0107693 | A1 | | 5/2010 | Rajala et al. |
| 2010/0313604 | A1 | * | 12/2010 | Watson et al. ............... 65/136.3 |

FOREIGN PATENT DOCUMENTS

| FR | 2912530 | 8/2008 |
| WO | 9203297 | 3/1992 |
| WO | 04000749 | 12/2003 |
| WO | 2010084291 A1 | 7/2010 |

OTHER PUBLICATIONS

Coelho, Joao M.P. et al., Local Laser-Decoiorizing of Gamma-Ray Irradiated Silicate Glass, Optical Engineering, vol. 50, No. 6, Jun. 2011, 9 pages.
Wikipedia, the free encyclopedia, QR Code, Aug. 19, 2011, 7 pages.
PCT Notification of the International Search Report and the Written Opinion of the International Searching Authority International App No. PCT/US2013/040844 International Filing Date: May 14, 2013 Date of Mailing: Sep. 23, 2013.

* cited by examiner

*Primary Examiner* — Cynthia Szewczyk

(57) ABSTRACT

A method of making a glass container with an optically readable graphic data carrier. A glass container is exposed to electromagnetic radiation to produce discoloration within the glass of the container, and then focused beam energy is directed at the glass container in a pattern corresponding to a desired graphic data carrier to heat the glass and selectively remove the discoloration in the pattern corresponding to the desired graphic data carrier.

27 Claims, 2 Drawing Sheets

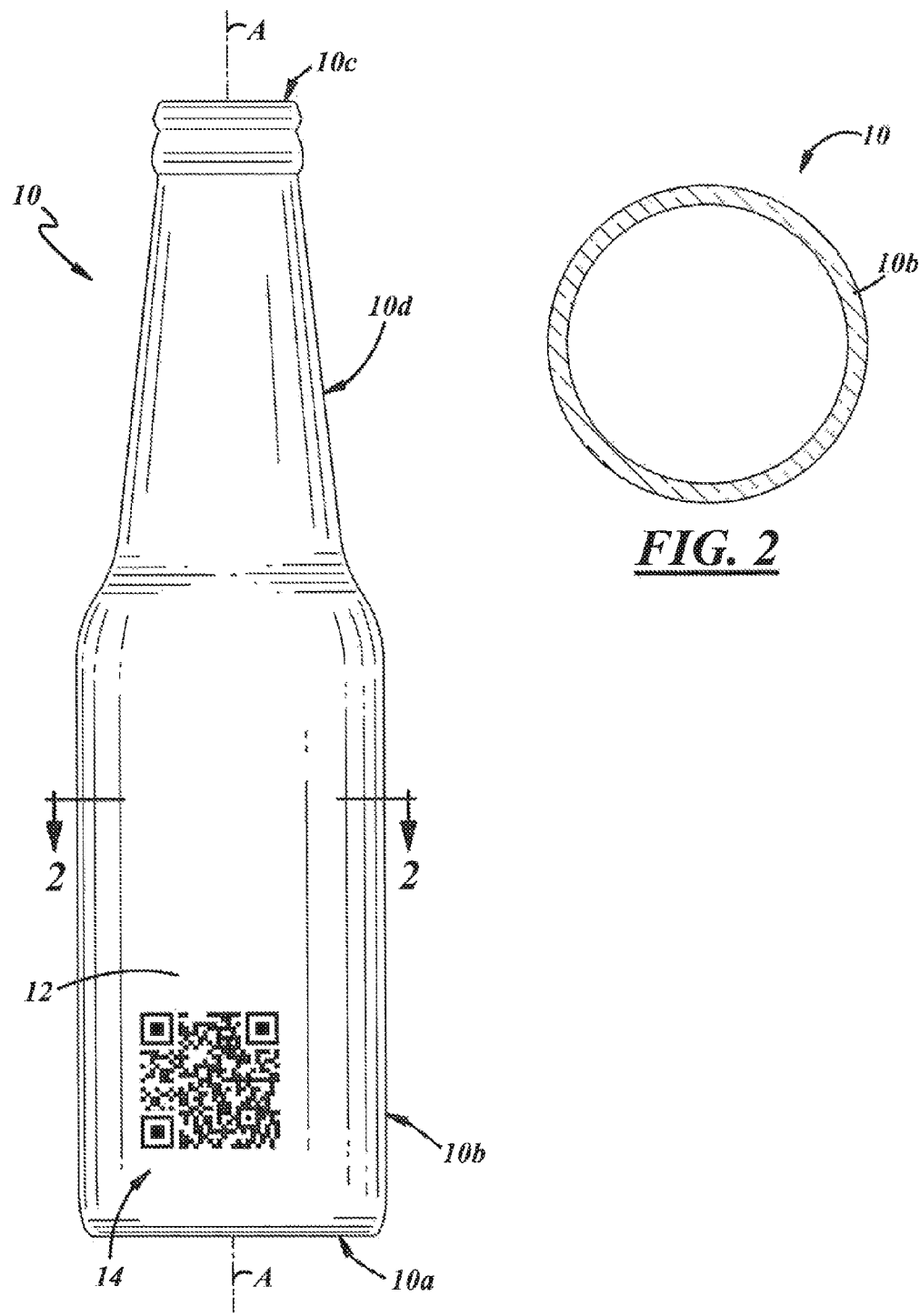

GLASS CONTAINER HAVING A GRAPHIC DATA CARRIER

The present disclosure is directed to glass container manufacturing and, more particularly, to marking of glass containers.

BACKGROUND AND SUMMARY OF THE DISCLOSURE

A general object of the present disclosure, in accordance with one aspect of the disclosure, is to provide a method of manufacturing a glass container with a radiation-integrated optically readable graphic data carrier, thereby eliminating the need to apply a separate graphic data carrier label to the container.

The present disclosure embodies a number of aspects that can be implemented separately from or in combination with each other.

A method of making a glass container with an optically readable graphic data carrier in accordance with one aspect of the present disclosure includes exposing a glass container to electromagnetic radiation to produce discoloration within the glass of the container, and then directing focused beam energy at the glass container in a pattern corresponding to a desired graphic data carrier to heat the glass and selectively remove the discoloration in a pattern corresponding to the desired graphic data carrier.

In accordance with another aspect of the disclosure, there is provided a method of manufacturing a glass container with an optically readable graphic data carrier. The method includes producing a glass melt including a bulk composition doped with at least one electromagnetic-radiation-sensitive dopant, and forming a glass container from the glass melt. The method also includes annealing the glass container, and then selectively exposing the formed glass container to electromagnetic radiation to produce a localized discolored portion of the glass container, and then directing focused beam radiation at the glass container in a pattern corresponding to a desired graphic data carrier to heat the glass and selectively remove parts of the localized discoloration portion in the pattern corresponding to the desired graphic data carrier.

In accordance with a further aspect of the disclosure, there is provided a method of making a glass container with an optically readable QR code, which includes the steps of (a) exposing a glass container to X-ray or gamma-ray radiation to produce discoloration within the glass of the container, and then (b) directing laser energy at the glass container in a pattern corresponding to a desired QR code to heat the glass and selectively remove the discoloration produced in the step (a) in a pattern corresponding to the desired QR code.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is an elevational view of a glass container manufactured to include a graphic data carrier in accordance with an exemplary embodiment of the present disclosure;

FIG. 2 is a cross-sectional view of the glass container of FIG. 1 taken along line 2-2 of FIG. 1;

DETAILED DESCRIPTION OF PREFERRED EMBODIMENTS

Figure 3:
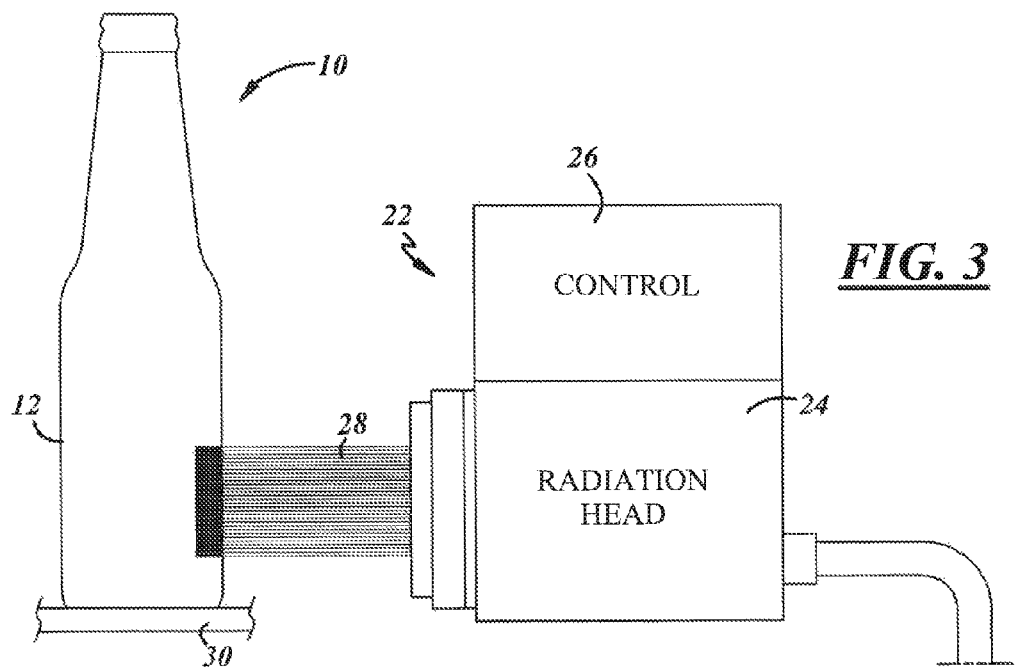
FIG. 3 is a functional block diagram that illustrates selective radiation discoloration of a portion of the container in accordance with an exemplary embodiment of the present disclosure.

FIG. 1 illustrates an exemplary embodiment of a glass container 10 (e.g., glass bottle, jar, or the like) having a glass container composition that may be produced in accordance with exemplary embodiments of a glass manufacturing process presently disclosed herein below. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

For example, as shown in FIG. 2, the body 10b may be of cylindrical transverse cross-sectional shape that is circumferentially closed. In other embodiments, the body 10b may be generally oval, square, rectangular, triangular, or of any other suitable transverse cross-sectional shape. As used herein, the term circumferentially applies not only to circular transverse cross-sectional shapes but also applies to any closed transverse cross-sectional shape.

Referring to FIG. 1, the container 10 includes a wall 12 having an optically readable graphic data carrier 14 that is integrated with the container via radiation. The carrier 14 may include a Quick Response (QR) code, a barcode, a two-dimensional data matrix, or the like. In any event, the carrier 14 may be serialized, wherein each of a plurality of containers is provided with a unique carrier 14, for instance, in sequential order. In the embodiment illustrated in FIG. 1, the wall 12 is a radially outer wall of a cylindrical body 10b. But in other embodiments, the graphic-data-carrier-bearing wall 12 may be of any other suitable shape; may be on the base 10a, may be on the neck 10d, or the like. As will be discussed in greater detail below, the graphic data carrier 14 is integrated into the container 10 via selective application by electromagnetic radiation and then focused beam radiation, thereby eliminating the need to apply a separate graphic data carrier label to the container. The glass container 10 may be produced by the following method.

The method may include producing a glass melt including a bulk composition doped with at least one dopant that may include less than 0.1 wt % of the bulk composition of the glass melt. The dopant is sensitive to electromagnetic radiation, wherein application of electromagnetic radiation to the doped container 10 will cause the dopant to respond by discoloring radiated portions of the container 10. In an example embodiment, the electromagnetic-radiation-sensitive dopant may include an ionization-responsive dopant. The electromagnetic-radiation-sensitive dopant may include one or more transition metal oxides (TMOs). The TMOs may include one or more oxides of copper, silver, gold, or of any other suitable transition metal. In another embodiment, the electromagnetic-radiation-sensitive dopant also or instead may include one or more inorganic oxides, for instance, bismuth oxide, or selenium oxide. In a further embodiment, the electromagnetic-radiation-sensitive dopant also or instead may include one or more rare earth oxides, for instance, cerium oxide, or the like. The dopant may be added to the bulk composition as an oxide, for example, $SnO_2$ and may be present in the container as SnO. In any event, the dopant may be present in the container as an oxide.

The bulk composition for the glass melt may be produced from a batch of raw materials. For example, each of the raw materials for the batch may be weighed out on scales in a batch house and placed in a batch mixer which homogenously mixes the raw materials together. Thereafter, the mixed batch of raw materials may be charged into a continuously operated glass batch furnace through a "doghouse" or small vestibule at the upstream end of the furnace. The glass batch furnace may include an upstream end where the raw materials are introduced, and a downstream end from which molten glass is distributed. The raw materials may be charged into the furnace at substantially the same rate as glass is being pulled out of the furnace so that the amount of glass in the furnace is generally constant.

The batch of raw materials may include base glass-forming raw materials, which may include soda-lime-silica glass-forming materials. The soda-lime-silica glass-forming materials may comprise predetermined amounts of sand, soda ash, limestone, dolomite, feldspar, gypsum, salt cake, carbon, cullet, and the like. The major constituents of the base glass portion may include silica ($SiO_2$), soda ($Na_2O$), lime (CaO), alumina ($Al_2O_3$), magnesia (MgO), and potassium oxide ($K_2O$). In one embodiment, the base glass-forming raw materials may be formulated to produce a batch of generally colorless flint base glass.

For example, the flint base glass portion may comprise the following materials in the following ranges of amounts by weight of the glass batch composition:

60-75% $SiO_2$
7-15% $Na_2O$
6-12% CaO
0.1-3.0% $Al_2O_3$
0-2.0% MgO
0-2.0% $K_2O$

More particularly, and by way of example only, the flint base glass portion may include the following materials in amounts by weight of the glass batch composition:

73.1%, $SiO_2$
13.1% $Na_2O$
10.6% CaO
1.8% $Al_2O_3$
0.5% MgO
0.4% $K_2O$

The glass batch composition may include the flint base glass portion, the dopant, and other materials in relatively small amounts. Such materials may be additives, residual materials from cullet, and/or impurities in the batch of raw materials, which are typical in the glass container manufacturing industry. For example, each of the other materials may be present in the glass batch composition in trace amounts, for example, less than 0.2 wt %.

In any case, the batch of raw materials may be introduced into a tank of the furnace through the doghouse. The furnace tank may include a melter in which the batch of raw materials is melted to produce a molten glass batch. The batch of raw materials may be melted, for example, at temperatures between 1400 and 1500 degrees Celsius for any suitable time, for instance, two to four hours. Thereafter, molten glass may flow from the tank, through a throat, and to a refiner at the downstream end of the furnace where the molten glass may be conditioned. From the furnace, the molten glass may be directed toward one or more forehearths. The one or more forehearths may be positioned downstream of the furnace and may include an upstream end including a cooling zone, a conditioning zone downstream of the cooling zone, and a downstream end in communication with a feeder.

The method also may include forming glass containers from the glass batch composition. For example, the feeder located at the downstream end of the one or more forehearths may measure out gobs of glass and deliver them to glass container forming machines. Thereafter, the gobs may be formed into glass containers, for example, by press-and-blow or blow-and-blow processes and by individual section machines, or in any other suitable manner by any suitable equipment. The glass containers formed from the glass batch composition may initially be generally colorless, for example, if the base glass portion is a flint base glass.

The method further may include annealing the glass containers in any suitable manner, for example, in an annealing lehr. At an entry, hot end, or upstream portion of the annealing lehr, the temperature therein may be, for instance, between 550 and 600 degrees Celsius. Through the lehr, the temperature may be brought down gradually to a downstream portion, cool end, or exit of the lehr, for example, to a temperature therein of between 130 degrees Celsius and 65 degrees Celsius.

The method also includes selectively exposing the formed glass container to electromagnetic radiation to produce a localized discolored portion of the glass container. This step is carried out after annealing of the entire container 10. The electromagnetic radiation may include ionizing radiation, or any other suitable type of electromagnetic radiation. For example, the electromagnetic radiation may include X-ray, gamma-ray, or similar radiation. Example wavelengths of the electromagnetic radiation may include from 0.0001 nm to 10.0 nm, and example frequencies of the electromagnetic radiation may include greater than $3 \times 10^{16}$ Hz.

FIG. 3 is a functional block diagram of an exemplary apparatus for implementation of the present disclosure. After annealing, the container 10 may be presented by a conveyor 30 or in any other suitable manner, at a radiation station 22. A radiation head 24 is disposed at station 22 and coupled to a radiation head control 26 to direct a radiation beam 28 at the container wall 12. The radiation head 24 and container wall 12 preferably are oriented at the radiation station 22 such that the central axis of the radiation beam 28 is at a substantial angle, most preferably approaching a right angle, to the opposing outside surface of the container wall 12. Conveyor 30 can be of any suitable type, such as a linear conveyor or a starwheel conveyor. When the container 10 is cylindrical, the radiation station 22 could include a turntable, rotatable material handler, rollers, and/or any other suitable means for rotating the container, incrementally or continuously, so that the surface of the wall 12 opposite radiation head 24 is substantially orthogonal to the axis of radiation beam 28.

With the container 10 opposite of the radiation head 24, the radiation head 24 is controlled by the control 26 to direct the radiation beam 28 at the container wall 12. The radiation beam 28 may be directed at the outer surface of the container wall 12 and may penetrate into and/or through the wall 12. The radiation beam 28 is operated for a time and energy level sufficient to discolor the container wall 12. For example, the discoloration may start at the outside surface of the container wall 12 and extend radially inward into the container wall 12, toward or to the inner surface of the container wall 12. Radiation of the container wall 12 with the radiation beam 28 forms the localized discolored portion of the glass container. The localized discolored portion may be larger than the final visible outline of the graphic data carrier, for example, to ensure a sufficient outer peripheral margin or "quiet zone" for the graphic data carrier. The discolored portion may be applied by masking off the rest of the container 10 or a portion surrounding the discolored portion so that the radiation affects only the unmasked discolored portion. Any suitable mask and masking techniques may be used. In another embodiment, the discolored portion may be applied without a mask by controlling the output size of the radiation and/or the distance between the radiation head 24 and the container 10.

The method further includes directing focused beam radiation or energy at the glass container 10 in a pattern corresponding to the desired graphic data carrier 14 to heat the container glass and selectively remove parts of the localized discoloration portion in the pattern corresponding to the desired graphic data carrier 14. This step is carried out after the radiation discoloration, and may include any suitable type of focused beam, for instance, light amplified by stimulated emission of radiation (laser) beam, focused ion beam, or the like.

Figure 4:
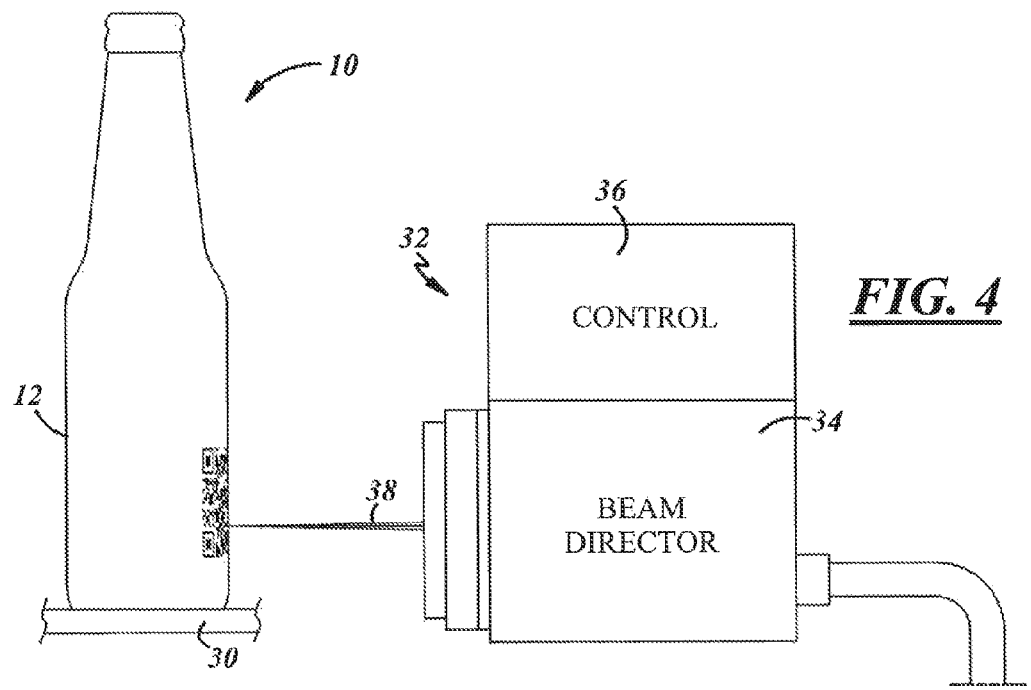
FIG. 4 is a functional block diagram that illustrates selective focused beam removal of parts of the localized discoloration of the container in accordance with an exemplary embodiment of the present disclosure.

For example, FIG. 4 is a functional block diagram of an exemplary apparatus for implementation of the present disclosure. After selective radiation discoloration, the container 10 may be presented by a conveyor 30 or in any other suitable manner, at a focused beam station 32. Beam directors 34 are disposed at station 32 and coupled to a beam director control 36 to direct a focused beam 38 at the container wall 12. The beam directors 34 and container wall 12 preferably are oriented at the focused beam station 32 such that the central axis of the focused beam 38 is at a substantial angle, most preferably approaching a right angle, to the opposing outside surface of the container wall 12. Conveyor 30 can be of any suitable type, such as a linear conveyor or a starwheel conveyor. When the container 10 is cylindrical, the focused beam station 32 could include a turntable, rotatable material handler, rollers, and/or any other suitable means for rotating the container, incrementally or continuously, so that the surface of the wall 12 opposite beam directors 34 is substantially orthogonal to the axis of focused beam 38.

With the container 10 opposite of the beam directors 34, the beam directors 34 are controlled by the control 36 to direct the focused beam 38 at the container wall 12. The focused beam 38 may be directed or focused at one or more points on the outside surface of the container wall 12, and/or between the inside and outside surfaces of the container wall 12. In general, the depth of heating of the container wall 12 by the beam 38 may correspond to the depth of penetration of the discoloration applied in the previous process step. The beam 38 may remove discoloration at the outside surface of the container wall 12 and may remove discoloration extending radially inward into the container wall 12 toward or to the inner surface of the container wall 12. The focused beam 38 is operated for a time and energy level sufficient to heat the container wall. The graphic data carrier (FIG. 1) may be formed by redirecting the focused beam 38 to different points within the container wall 12 and/or by repositioning the container 10 between illuminations. The conveyor 30 may be stationary or moving during and/or between focused beam shots, and one or multiple focused beam scans may be carried out to remove the discoloration. Heating of the container wall 12 with the focused beam 38 removes the discoloration to form the desired graphic data carrier.

In one embodiment, the process parameters can be tuned or modified to optimize contrast between the selectively removed parts of the localized discolored portion and the remainder of the localized discolored portion. The contrast may depend on the duration of the step of selectively exposing the formed glass container to electromagnetic radiation to produce a localized discolored portion of the glass container, and/or on the energy level of the radiation applied during that step. The contrast also or instead may depend on the duration of the step of directing focused beam radiation at the glass container, and/or on the energy level of the radiation applied during that step.

The controls 26, 36 may be used to carry out various aspects of the presently disclosed method. In one example, the controls 26, 36 may receive input data and instructions from a user and/or any other suitable device(s), process the received input in light of stored software and/or data, and transmit output signals the corresponding radiation head 24 and beam director 34. The controls 26, 36 may include, for example, one or more electrical circuits, electronic circuits or chips, and/or computers. In a computer embodiment, each of the controls 26, 36 generally may include memory, one or more processors coupled to the memory, one or more interfaces coupled to the processor(s), one or more input devices coupled to the processor(s), and/or one or more output devices coupled to the processor(s). Of course, the controls 26, 36 further may include or be coupled to any ancillary devices, for example, clocks, internal power supplies, and the like (not shown). Although not shown, the controls 26, 36 may be supplied with electricity by utility power, by an external power supply, for example, an AC to DC transformer, one or more batteries, fuel cells, or the like. In one embodiment, the control 26 may include an X-ray machine controller, a gamma-ray machine controller, or the like, and the control 36 may include a laser controller, a focused ion beam controller, or the like.

There thus has been disclosed a glass container and a method of manufacture, that fully satisfies all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of manufacturing a glass container with an optically readable graphic data carrier integrated into the container, which includes the steps of:
    (a) producing a glass melt including a bulk composition doped with at least one electromagnetic-radiation-sensitive dopant;
    (b) forming a glass container from the glass melt that includes a wall having inner and outer surfaces;
    (c) annealing the glass container; and then
    (d) selectively exposing a localized region of the wall of the formed glass container to electromagnetic radiation to produce a locally discolored region of glass between the inner and outer surfaces of the wall of the glass container; and then
    (e) directing focused beam radiation at the glass container in a pattern corresponding to a desired graphic data carrier to heat selective portions of glass in the locally discolored region such that discoloration produced in said step (d) is removed from the selective portions of glass in the locally discolored region in the pattern corresponding to the desired graphic data carrier.

2. The method set forth in claim 1 wherein the bulk composition of the glass melt produced in said step (a) includes less than 0.1 wt % of the at least one electromagnetic-radiation-sensitive dopant.

3. The method set forth in claim 1 wherein the bulk composition of the glass melt produced in said step (a) is doped with one or more ionization-responsive transition metal oxides (TMOs).

4. The method set forth in claim 1 wherein said step (d) includes exposing the localized region of the wall of the formed glass container to ionizing radiation.

5. The method set forth in claim 1 including modifying the duration of step (d), the duration of step (e), or both the duration of steps (d) and (e) to optimize contrast between the selective portions of glass in the locally discolored region and the discolored glass in the remainder of the locally discolored region.

6. The method set forth in claim 1 wherein the bulk composition of the glass melt produced in said step (a) includes a flint base glass portion.

7. A glass container produced by the method of claim 1.

8. The method set forth in claim 1 wherein step (e) includes directing laser energy at the glass container and the desired graphic data carrier includes a quick response code.

9. The method set forth in claim 1 wherein the at least one electromagnetic-radiation-sensitive dopant of said step (a) includes at least one transition metal oxide.

10. The method set forth in claim 1 including modifying the energy level of the electromagnetic radiation of step (d), the energy level of the focused beam radiation of step (e), or both the electromagnetic radiation of step (d) and the focused beam radiation of step (e) to optimize contrast between the selective portions of glass in the locally discolored region and the discolored glass in the remainder of the locally discolored region.

11. The method set forth in claim 1 wherein said step (d) includes exposing the localized region of the wall of the formed glass container to X-ray radiation, gamma-ray radiation, or a combination thereof.

12. A method of making a glass container with an optically readable graphic data carrier integrated into the container, which includes the steps of:
(a) exposing a glass container to electromagnetic radiation to produce discoloration within the glass of the glass container, and then
(b) directing focused beam energy at the glass container in a pattern corresponding to a desired graphic data carrier to heat selective portions of glass in the glass container such that the discoloration produced in the glass in said step (a) is removed from the selective portions of glass in the pattern corresponding to the desired graphic data carrier.

13. The method set forth in claim 12 wherein before said step (a) the glass of the glass container is doped with at least one electromagnetic-radiation-sensitive dopant.

14. The method set forth in claim 12 wherein the discoloration produced in the glass container in said step (a) is localized to less than the entire glass container.

15. A glass container produced by the method of claim 12.

16. The method set forth in claim 12 wherein step (b) includes directing laser energy at the glass container and the desired graphic data carrier includes a quick response code.

17. The method set forth in claim 12 wherein before said step (a) the glass of the glass container is doped with at least one transition metal oxide.

18. The method set forth in claim 12 wherein the glass container includes a wall having inner and outer surfaces, and said step (a) includes exposing the wall of the glass container to electromagnetic radiation to produce discoloration within the glass between the inner and outer surfaces of the wall of the glass container.

19. The method set forth in claim 18 wherein said step (b) includes directing focused beam energy at the glass container, between the inner and outer surfaces of the wall.

20. A method of making a glass container with an optically readable graphic data carrier integrated into the container, which includes the steps of:
(a) exposing a glass container to X-ray radiation, gamma-ray radiation, or a combination thereof to produce discoloration within the glass of the glass container, and then
(b) directing laser energy at the glass container in a pattern corresponding to a desired graphic data carrier to heat selective portions of the glass container such that the discoloration produced in said step (a) is removed from the selective portions of the glass container in said pattern corresponding to said desired graphic data carrier.

21. The method set forth in claim 20 wherein before said step (a) the glass of the glass container is doped with at least one electromagnetic-radiation-sensitive dopant.

22. The method set forth in claim 21 wherein the at least one electromagnetic-radiation-sensitive dopant includes at least one transition metal oxide.

23. The method set forth in claim 20 wherein the discoloration produced in said step (a) is localized to less than the entire class container.

24. A glass container produced by the method set forth in claim 20.

25. The method set forth in claim 20 wherein the glass container includes a wall having inner and outer surfaces, and said step (a) includes exposing the wall of the glass container to X-ray radiation, gamma-ray radiation, or a combination thereof to produce discoloration within the glass between the inner and outer surfaces of the wall of the glass container.

26. The method set forth in claim 25 wherein said step (b) includes directing laser energy at the glass container, between the inner and outer surfaces of the wall.

27. A method of manufacturing a glass container with an optically readable graphic data carrier integrated into the container, which includes the steps of:
(a) forming a glass container that includes a wall having inner and outer surfaces;
(b) annealing the glass container; and then
(c) selectively producing a locally discolored region of glass within the glass container between the inner and outer surfaces of the wall of the glass container; and then
(d) heating selective portions of glass in the locally discolored region of glass such that the discoloration produced in said step (c) is removed from the selective portions of glass in the locally discolored region in a pattern corresponding to a desired graphic data carrier.

* * * * *